United States Patent [19]

Hashimoto et al.

[11] Patent Number: 4,616,253

[45] Date of Patent: Oct. 7, 1986

[54] WHITE BALANCE CONTROL APPARATUS FOR COLOR VIDEO CAMERAS

[75] Inventors: Takaaki Hashimoto, Noda; Kazushi Minagawa, Yokohama, both of Japan

[73] Assignee: Nippon Kogaku K.K., Tokyo, Japan

[21] Appl. No.: 499,232

[22] Filed: May 31, 1983

[30] Foreign Application Priority Data

Jun. 2, 1982 [JP] Japan ................................. 57-94446

[51] Int. Cl.⁴ .......................... H04N 9/73; H04N 9/04
[52] U.S. Cl. .......................................... 358/29; 358/41
[58] Field of Search ................... 358/29, 161, 50, 52, 358/41

[56] References Cited

FOREIGN PATENT DOCUMENTS

| 11583 | 1/1982 | Japan | 358/41 |
|-------|--------|-------|--------|
| 25774 | 2/1982 | Japan | 358/294 |
| 26976 | 2/1982 | Japan | 358/29 |

Primary Examiner—James J. Groody
Assistant Examiner—Randall S. Svihla
Attorney, Agent, or Firm—Michael N. Meller

[57] ABSTRACT

A color video camera white balance control apparatus including light sensors for sensing the color temperature of a light illuminating an object. The apparatus has an automatic follow-up mode for automatically effecting the white balance adjustment by controlling the gains of the color signal amplifiers of the color video camera in accordance with the detection outputs of the light sensors and a standard mode for controlling the gains of the amplifiers in accordance with preset values irrespective of the output values of the lights sensors, and also the apparatus is so designed that the standard mode is selected automatically or manually upon indication of a warning when the luminous intensity of the illuminating light becomes lower than a fixed level (or when the light sensor output values become lower than a certain value).

5 Claims, 2 Drawing Figures

WHITE BALANCE CONTROL APPARATUS FOR COLOR VIDEO CAMERAS

BACKGROUND OF THE INVENTION

The present invention relates to color video cameras and more particularly to improvements in the white balance control apparatus for color video cameras.

The white balance adjustment of a color video camera can be performed automatically by sensing changes in the color temperature of an illuminating light by means of sensors of the R, G and B light components which are independent of the area imaging device of the video camera and have substantially the same characteristics as the R (red), G (green) and B (blue) imaging characteristics of the video camera, and by controlling a part or the whole of the gains of the R, G and B color signals in the video camera.

This method of separately providing light sensors for detecting changes in color temperature can automatically perform the white balance adjustment continuously or at any desired time in response to a continuous change in the color temperature of an illuminating light without using any specific white or achromatic object and without interrupting the shooting in progress, and the method has particularly important merits when used with portable video systems.

However, this method has the following disadvantages. In other words, the luminous intensities which can be measured by the light sensors (the photodiodes, silicon cells, etc.) have a limitation which is dependent on the signal-to-noise ratio so that when the absolute intensity of the light illuminating the object decreases, the measured value of the light tends to become extremely unreliable. (For example, a commercially available color temperature meter is provided with a note that its measured value cannot be assured if the luminous intensity is lower than a certain value.) As a result, the above-mentioned method of controlling the gains of the color signals in the video camera by means of the light sensors naturally has a limitation with respect to the luminous intensities and thus the white balance adjustment cannot be effected at illumination levels lower than a certain intensity. Usually, night scenes and candle-lit scenes have luminances which are substantially lower than that which can be measured by the light sensors and therefore the above-mentioned method of separately providing light sensors cannot be used for shooting such scenes.

SUMMARY OF THE INVENTION

It is the primary object of this invention to provide an improved white balance control apparatus so designed that even if the intensity of an illuminating light is decreased, making the white balance control inoperative, a picture is still produced which has a white balance which conforms relatively well to the color temperature of the illuminating light.

Of the methods in which light sensors are separately provided, one in which the continuously varying color temperature of an illuminating light is continuously sensed by the light sensors and the gains of a part or all of R, G and B signals are continuously controlled, thus effecting the white balance adjustment independent of the shooting operation, will hereinafter be referred to as an automatic follow-up method and will be described hereunder.

To accomplish the above-mentioned object, a video camera incorporating the invention is characterized in that it includes an automatic follow-up mode (hereinafter referred to as an automatic mode) for controlling the gains of color signal amplifiers of the video camera by means of light sensors, for example, and another mode (hereinafter referred to as a standard mode) for controlling the gains of the amplifiers in accordance with preset values irrespective of the output values of the light sensors, and in that the mode is changed to the standard mode automatically or manually in response to a warning indication when the intensity of the illuminating light is lower than a predetermined level (i.e., when the output values of the light sensors are lower than a given value).

In accordance with an embodiment of the invention, a color video camera comprises:

(a) means for detecting the color temperature of incident light from an object field;

(b) means for generating at least one first color temperature signal indicative of the color temperature detected by the color temperature detecting means;

(c) means for generating at least one second color temperature signal indicative of a predetermined color temperature;

(d) means for controlling the white balance of video signals;

(e) incident light quantity detecting means for detecting that the incident light quantity from the object field is less than a predetermined value and generating a detection signal; and (f) transmitting means adapted to usually transmit the first color temperature signal to the control means and to be responsive to the generation of the detection signal to transmit to the control means the second color temperature signal in place of the first color temperature signal.

In accordance with a second embodiment of the invention, a color video camera comprises:

(a) means for detecting the color temperature of incident light from an object field;

(b) means for generating at least one first color temperature signal indicative of the color temperature detected by the color temperature detecting means;

(c) means for generating at least one second color temperature signal indicative of a predetermined color temperature of the incident light from the object field;

(d) means for controlling the white balance of video signals;

(e) means for detecting the quantity of a predetermined component of the incident light from the object field and producing a detection signal indicative of the detected quantity of said predetermined component of the incident light;

(f) comparing means for comparing said detection signal with a predetermined value, said comparing means generating a comparison signal when said detection signal is less than said predetermined value; and (g) transmitting means adapted to usually transmit the first color temperature signal to the control means and to be responsive to the generation of said comparison signal so as to transmit to the control means the second color temperature signal in place of the first color temperature signal.

In the first embodiment, the incident light quantity detecting means includes means for comparing preferably the green component of the incident light from the object field with the predetermined value.

The white balance control means includes:

means for subjecting the red, blue and green components of an object image to photoelectric conversion; and means, including first amplifier means for amplifying and outputting the photoelectrically converted red component, and second amplifier means for amplifying and outputting the photoelectrically converted blue component, whereby the proportions of the photoelectrically converted red, blue and green components of the object image are adjusted.

In the first and second embodiments the first and second amplifier means respectively control the gain in accordance with the first or second color temperature signal selected and transmitted by the automatic change-over operation of the transmitting means.

The above and other objects as well as advantageous features of the invention will become clearer from the following description taken in conjunction with the attached drawings.

DESCRIPTION OF THE PREFERRED EMBODIMENTS

Figure 1:
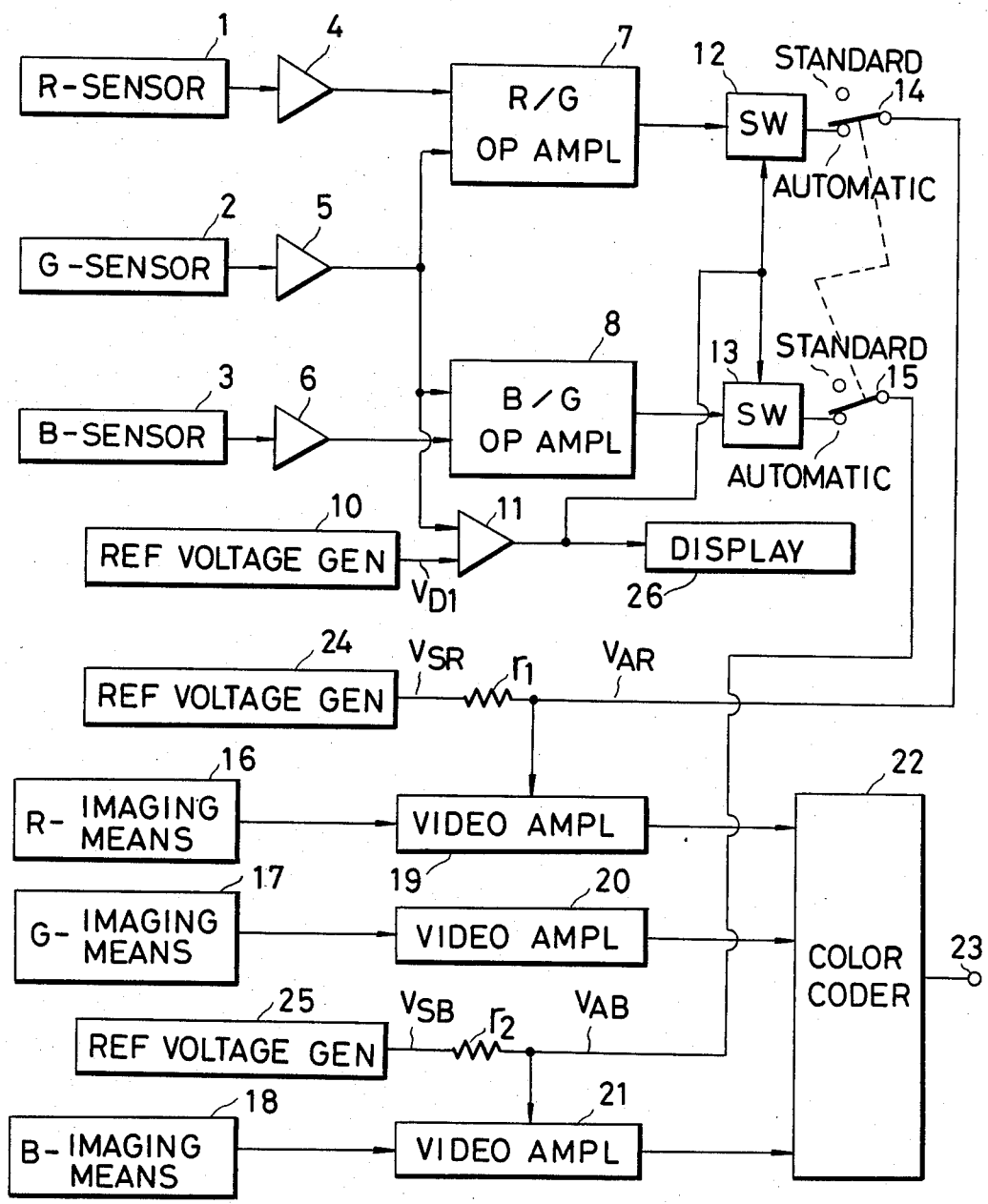
FIG. 1 is a block diagram showing an embodiment of the invention.

FIG. 1 is a block diagram showing the principal parts of an automatic follow-up type white balance control apparatus for video cameras according to the invention.

In FIG. 1, numerals 1, 2 and 3 designate light sensors for respectively sensing the R, G and B components of light. Numerals 4, 5 and 6 designate amplifiers for amplifying the output of the light sensors 1, 2 and 3, respectively. Numerals 7 and 8 designate operational amplifiers for respectively computing the ratio R/G of the outputs from the amplifiers 4 and 5 and the ratio B/G of the outputs from the amplifiers 6 and 5. Numeral 10 designates a reference voltage generator, and 11 a comparator. In this embodiment, the comparator 11 compares the output of the amplifier 5, or the level of G component, and a constant voltage ($V_{D1}$ in the illustrated embodiment) generated by the reference voltage generator 10 so that when the output of the amplifier 5 becomes lower than the constant voltage $V_{D1}$, that is, when the luminous intensity of an illuminating light decreases and becomes lower than the light measuring capacity of the light sensors, a standard mode setting signal which will be described latter is generated. A display unit 26 is responsive to the standard mode setting signal to indicate that the standard mode must be selected. Numerals 12 and 13 designate switches which each comprise a semiconductor device such an FET and are adapted to be turned off in response to the generation of the standard mode setting signal from the comparator 11. Numerals 14 and 15 designate manual automatic/standard mmode selector switches, 16, 17 and 18 designate R, G and B imaging means of a three-tube/type video camera, and 19, 20 and 21 designate video amplifiers for amplifying the signals from the respective imaging means 16, 17 and 18 to the normal level. In this case, each of the video amplifiers 19 and 21 includes a variable gain section and thus they are adapted to effect variable amplification in response to the output from the operational amplifiers 7 and 8, respectively. Numeral 22 designates a color coder for combining the output signals from the video amplifiers 19, 20 and 21 into a standard color signal (e.g., an NTSC signal). Numeral 23 designates an output terminal of the color coder 22, and 24 and 25 designate reference voltage generators arranged to apply their constant voltages ($V_{SR}$ and $V_{SB}$ in the illustrated case) to the variable gain sections of the video amplifiers 19 and 21 through resistors $r_1$ and $r_2$, respectively.

With the video camera constructed as described above, the gains of the video amplifiers 19 and 21 and the outputs ($V_{AR}$ and $V_{AB}$ in the illustrated case) of the operational amplifiers 7 and 8 are preliminarily adjusted in such a manner that a white-balanced color signal is generated at the output terminal 23 when a white or achromatic object illuminated by a light having a predetermined color temperature of 3200° K., 6000° K., or the like is detected through the light sensors 1, 2 and 3 and the imaging means 16, 17 and 18. Also, the outputs $V_{SR}$ and $V_{SB}$ of the reference voltage generators 24 and 26 are selected to respectively become equal to the outputs of the operational amplifiers 7 and 8 in the above-mentioned case.

With the video camera adjusted in this way, if shooting is effected with a given color temperature, the output from each of the operational amplifiers 7 and 8 indicates a deviation from the given color temperature. In the case of a scene having a high color temperature, the B component light increases with respect to the R component light so that the output level of the operational amplifier 7 decreases and the output level of the operational amplifier 8 increases. In accordance with the invention when this occurs the gain of the video amplifier 19 is increased and the gain of the video amplifier 21 is decreased. As a result, the R signal is amplified to a greater extent and the B signal is less amplified. These signals are combined by the color coder 22 and a white-balanced signal is delivered to the output terminal 23. In the case of a scene having a lower color temperature, the operation is reversed to automatically and continuously correct the white balance of the signal and generate it at the output terminal 23. While these operations correspond to the automatic mode in cases where the illuminating light is sufficiently bright and the light is satisfactorily measurable by the light sensors 1, 2 and 3, if the illuminating light is dim, that is, the illuminating light is lower than the lower limit of the light sensors 1, 2 and 3, as in the case of shooting a night scene, a standard mode is selected in the following manner. In other words, the output of amplifier 5, which amplifies the light sensor G component, is compared with the output $V_{D1}$ of the reference voltage generator 10 by the comparator 11 and the luminous intensity is determined. Thus, if the illuminating light is less than the light measuring capacity of the light sensors, the comparator 11 generates a standard mode setting signal so that the switches 12 and 13 are turned off and the display unit 26 indicates that the illuminating light is less than the light measuring capacity of the light sensors. Thus, in this case the gains of the video amplifiers 19 and 21 are controlled in accordance with the respective outputs $V_{SR}$ and $V_{SB}$ of the reference voltage generators 24 and 25. These voltages are selected in such a manner that the proper white balance is ensured by an illuminating light having a predetermined color temperature (e.g., 3200° K.) and satisfactory color reproduction is stably ensured when the scene being shot is very dark, such as a night scene or an indoor scene.

In the embodiment of FIG. 1, the standard mode can also be selected manually. In this case, by arranging so that the selector switches 14 and 15 can be opened manually by means, for example, of an actuating member mounted on the side of the video camera, it is possible to select the standard mode as desired even if the switches 12 and 13 are on. In this case, it is convenient to provide means for confirming whether the automatic mode or the standard mode has been selected by the operator, for example, by means of a finder display unit.

Figure 2:
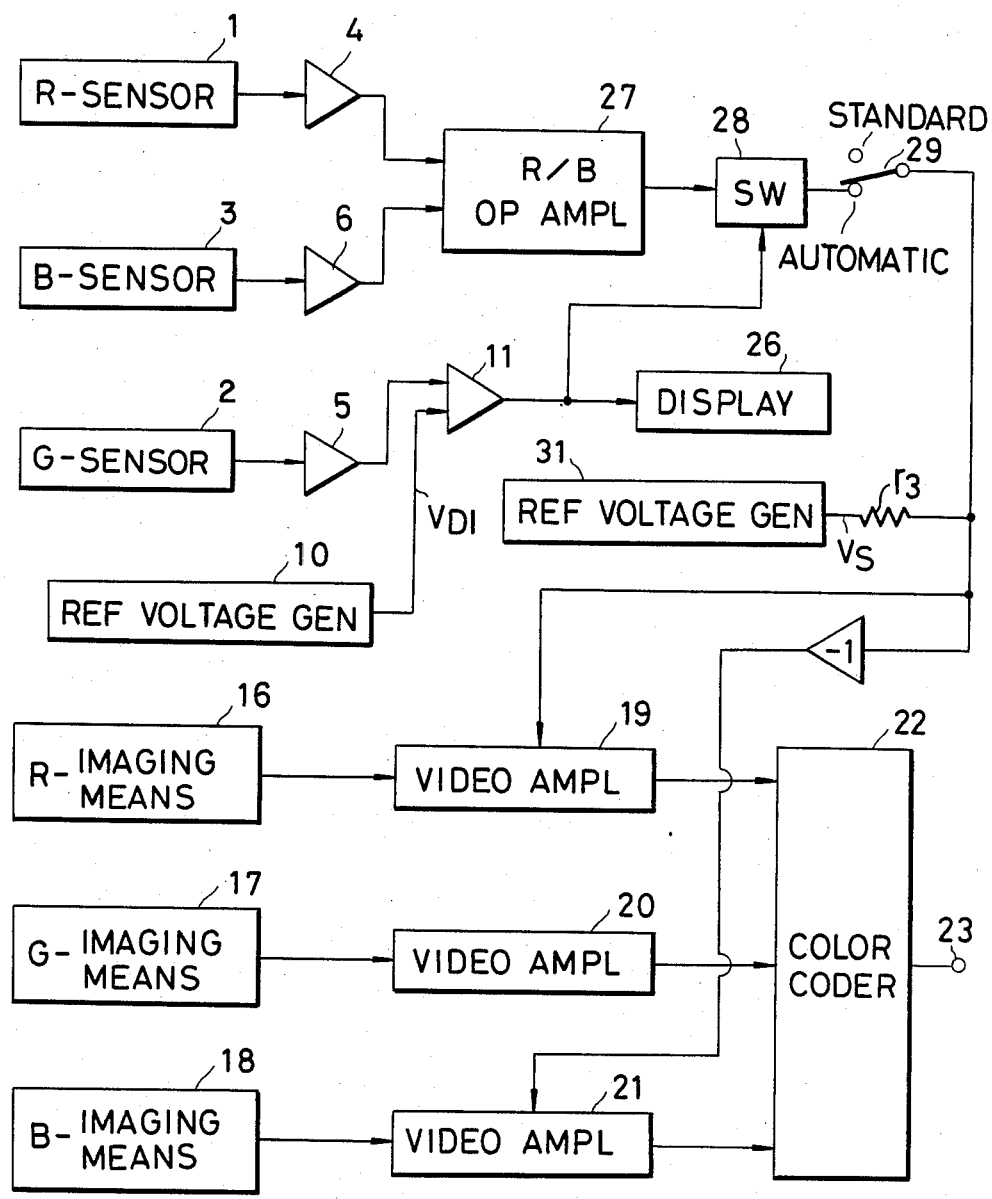
FIG. 2 is a block diagram showing another embodiment of the invention.

FIG. 2 shows another embodiment of the invention. The blocks having the same functions as their counterparts in FIG. 1 are designated by the same numerals. An operational amplifier 27 computes the ratio R/B of the outputs from the amplifiers 4 and 6. Numeral 28 designates a switch comprising a semiconductor device, e.g., an FET as in the case of the switches 12 and 13. Numeral 29 designates a manual automatic/standard mode selector switch. Numeral 31 designates a reference voltage generator whereby a constant voltage $V_S$ is applied to the variable gain section of the video amplifier 19 through a resistor $r_3$ and also it is inverted in polarity and applied to the variable gain section of the video amplifier 21. As in the case of the voltages $V_{SR}$ and $V_{SB}$ in the embodiment of FIG. 1, the voltage $V_S$ from the reference voltage generator 31 is selected to be equal to the output generated from the operational amplifier 27 when a white or achromatic object is illuminated by light of a predetermined color temperature.

While the embodiments shown in FIGS. 1 and 2 have been described in connection with a video camera of the three-tube type (three-plate type), the invention is not intended to be limited to these embodiments and the invention can be applied to video cameras of various other types employing a solid-state imaging device, etc.

Further, while in the above-described embodiments the light measuring capacity of the light sensors is determined in accordance with the G component light sensor output, similar effects can of course be obtained by any one of the other outputs. Further, while in these embodiments the standard mode corresponds to a single predetermined color temperature, the invention can be easily applied to a video camera having a plurality of standard modes. Still further, the invention is not limited to these embodiments but rather is applicable to all video cameras of the type in which the gains of video camera color signals are controlled by using light sensors.

In addition, while the invention has been described as applied to the automatic follow-up type of camera, the invention can be applied to all color video cameras of the type including color temperature detecting light sensors so as to control the color signals in accordance with the outputs of the sensors.

Finally, the invention is of course not limited to video cameras for moving pictures, but it is also applicable to color video cameras for taking still pictures.

What is claimed is:

1. In a color video camera for generating video signals of an image of an object, the combination comprising:
    (a) means for detecting a color temperature of incident light from an object field;
    (b) means for generating at least one first color temperature signal indicative of said color temperature detected by said color temperature detecting means;
    (c) means for generating at least one second color temperature signal indicative of a predetermined color temperature;
    (d) means for controlling a white balance of video signals;
    (e) incident light quantity detecting means for detecting that the incident light quantity from said object field is less than a predetermined value and generating a detection signal; and
    (f) transmitting means adapted to usually transmit said first color temperature signal to said control means and to be responsive to the generation of said detection signal so as to transmit to said control means said second color temperature signal in place of said first color temperature signal, wherein said incident light quantity detecting means includes means for comparing a green component of the incident light from said object field with said predetermined value.

2. The combination according to claim 1, wherein said control means comprises:
    (a) means for subjecting red, blue and green components of an image of an object to photoelectric conversion; and
    (b) means including first amplifying means for amplifying and outputting said photoelectrically converted red component, second amplifying means for amplifying the outputting said photoelectrically converted blue component, and means for adjusting proportions of said photoelectrically converted red, blue and green components of said object image.

3. The combination according to claim 2, wherein the gains of each of said first and second amplifying means are controlled by said first and second color temperature signals selectively transmitted from said transmitting means.

4. In a camera for generating video signals of an image of an object, the combination comprising:
    (a) means for detecting a color temperature of incident light from an object field;
    (b) means for generating at least one first color temperature signal indicative of said color temperature detected by said color temperature detecting means;
    (c) means for generating at least one second color temperature signal indicative of a predetermined color temperature of the incident light from the object field;
    (d) means for controlling a white balance of video signals;
    (e) means for detecting the quantity of a predetermined component of the incident light from said object field and producing a detection signal indicative of the detected quantity of said predetermined component of the incident light;
    (f) comparing means for comparing said detection signal with a predetermined value, said comparing means generating a comparison signal when said detection signal is less than said predetermined value; and
    (g) transmitting means adapted to usually transmit said first color temperature signal to said control means and to be responsive to the generation of said comparison signal so as to transmit said second color temperature signal to said control means in place of said first color temperature signal.

5. The combination according to claim 4, wherein said predetermined component is a green component.

* * * * *